United States Patent [19]

Pouey

[11] Patent Number: 4,673,292
[45] Date of Patent: Jun. 16, 1987

[54] MONOCHROMATOR WITH A TELECENTRIC DISPERSIVE LENS

[75] Inventor: Michel Pouey, Viroflay, France

[73] Assignee: Centre National de la Recherche Scientifique, Paris, France

[21] Appl. No.: 687,256

[22] Filed: Dec. 28, 1984

[30] Foreign Application Priority Data

Dec. 30, 1983 [FR] France .................................. 83 21139

[51] Int. Cl.⁴ .............................................. G01J 3/18
[52] U.S. Cl. .................................................... 356/334
[58] Field of Search ............... 356/305, 328, 331, 332, 356/334; 350/3.7

[56] References Cited

U.S. PATENT DOCUMENTS

| | | | |
|---|---|---|---|
| 3,628,849 | 12/1971 | Flamand et al. | 356/328 |
| 3,930,728 | 1/1976 | Pieuchard et al. | 350/3.7 |
| 3,973,850 | 8/1976 | Pouey | 356/305 |
| 4,068,954 | 1/1978 | Da Silva | 356/334 |
| 4,087,183 | 5/1978 | Passereau | 356/305 |
| 4,191,474 | 3/1980 | Passereau | 356/305 |
| 4,455,088 | 6/1984 | Koike | 356/334 |

FOREIGN PATENT DOCUMENTS

| | | | |
|---|---|---|---|
| 1089996 | 9/1960 | Fed. Rep. of Germany | 356/332 |
| 2323132 | 3/1978 | France | |
| 2531213 | 2/1984 | France | |
| 0060232 | 4/1982 | Japan | 356/328 |

OTHER PUBLICATIONS

Hallgren, *Am. Lab.*, V. 9, N. 11, Nov. 1977, pp. 69-75.
Nuclear Instruments and Methods, vol. 172, 1980, K. Codling-"Recent European Advances in Monochromator Design for use with Synchrotron Radiation Sources", pp. 107-122.

*Primary Examiner*—F. L. Evans
*Attorney, Agent, or Firm*—Burns, Doane, Swecker & Mathis

[57] ABSTRACT

The invention relates to a monochromator including a telecentric dispersive lens (TD0) in which the collimated diffracted beam (2) at an angle $\beta$ with respect to the normal to the telecentric dispersive lens (TD0) is focused at the focus of a telescope ($T_2$) fitted with a straight slit (S') the optical axis of the telescope ($T_2$) being merged with the direction of the diffracted beam (2) and the slit (S') being parallel to the direction of the lines of the telecentric dispersive lens (TD0), the collimated incident beam (1), at an angle $\alpha$ giving the collimated diffracted beam (22) at an angle $\beta$ after diffraction by the telecentric dispersive lens (TD0).

10 Claims, 7 Drawing Figures

MONOCHROMATOR WITH A TELECENTRIC DISPERSIVE LENS

This invention relates to a monochromator with a telecentric dispersive lens.

A telecentric dispersive lens is an objective produced by an holographic process hereinafter indicated as TDO giving from a collimated incident beam coming from an object either at a finite distance or at infinity, at an angle $\alpha$, a collimated diffracted beam at an angle $\beta$. The angle between the beams at the summit of TDO being $\alpha - \beta = 2\theta$, such that $m\lambda = 2\lambda_o \cos\theta$, m being the order of diffraction and $\lambda_o$ the recording wavelength of the hologram. The present invention does not relate to the embodiment of the telecentric dispersive lens per se. Rather, it is concerned with a method, called holographic, and describes for this method recording characteristics which enable a characteristic non-uniform distribution of fringes to be obtained. In the plane of the TDO lens, this distribution of fringes results from the intersection of a section of a sphere (of center O' and radius R) with an elliptic paraboloid, which represents the equiphase surfaces of the interference system obtained from a source point (c) located at the center of curvature and a collimated beam inclined at an angle $\delta$ (point D). This known fringe distribution can also be generated by mechanical or ion beam processing. In this case, the number of lines per millimeter is not limited by the practical value of the angle $\delta$. Then one of the source points C is at the center of curvature O' of TDO and the other D being at infinity and inclined at an angle $\delta$ with respect to the normal to TDO; the angle $\delta$ being equal to that formed by the normal to the TDO and the bisectrix of the angle $2\theta$.

The monochromator according to the present invention is a monochromator including a combination of a telecentric dispersive lens and various optical means. The various optical means are telescopes for which hereafter will be found a definition within the meaning of the present invention as well as combinations of plane mirrors located ahead. These mirrors can be rotated or a single mirror can turn and the other mirror can be fixed.

The monochromator according to the present invention includes at least one straight slit and a collimator.

This monochromator can work either with incident and diffracted beams having variable directions in space or with incident and diffracted beams fixed in space.

Various telescopes can be used in such a monochromator.

By telescope it is understood in the present invention to include various optical means such as concave mirrors, parabolic mirrors, dioptric collimators, a Cassegrainian telescope, a Wolter telescope, associated elliptical mirrors and hyperbolic mirrors and any one of the various combinations of the said optical means.

In the monochromator of the invention, if the incident and diffracted beams are variable in direction, the telecentric dispersive lens is fixed.

In the case in which the incident and diffracted beams passing through the telescopes are fixed in direction in space, the telecentric dispersive lens moves with a simple movement of translation. Such a translation can be made in two directions: in the direction of the bisectrix of the incident and diffracted beams on the telecentric dispersive lens or in the direction of the diffracted or incident beam.

In the prior art, monochromators have already been described using plane gratings working in collimated light in the object and image space.

In such monochromators, the variation in wavelength is produced by rotation of the plane grating. These monochromators have three major disadvantages:

the useful spectral range is limited to wavelengths greater than 160 nm, all the optical components work in normal incidence and a multiplicity of reflections are necessary;

the plane grating introduces aberrations that cannot be compensated for;

the slits of the optical means are necessarily curved, which necessarily produces machining problems.

The present invention overcomes the above-mentioned disadvantages of monochromators according to the prior art:

the spectral range is broader;

the aberrations are made negligible at any incidence and the monochromator can work at grazing incidence;

because the aberrations are made balanced, the monochromator of the invention has a very high resolving power with high luminosity allowed with large sized straight slits.

Those skilled in the art understand the practical advantages obtained by the use of straight slits in place of curved slits in all fields of implementation and application.

The subject of the present invention is a monochromator including a telecentric dispersive lens (TDO) produced by an holographic process giving from a collimated incident beam, at an angle $\alpha$, a collimated diffracted beam at an angle $\beta$. The angle between the beams at the summit of TDO being $\alpha - \beta = 2\theta$; such that $m\lambda = 2\lambda_o \cos\theta$, m being the order of diffraction and $\lambda_o$ being the record wavelength of the hologram. One of the source points C being at the center of curvature O' of TDO and the other D being at infinity and inclined at an angle $\delta$ with respect to the normal to TDO; the angle $\delta$ being equal to that formed by the normal to the TDO and the bisectrix of the angle $2\theta$; in which the collimated diffracted beam at an angle $\beta$, with respect to the normal to the telecentric dispersive lens, is focused at the focal point of a telescope fitted with a straight slit, the optical axis of the said telescope being merged with the direction of the said diffracted beam and the slit being parallel to the direction of the lines of the telecentric dispersive lens.

The present invention also related to the following characteristics considered separately or in any of the technically possible combinations of them.

the parallel incident beam comes from a telescope fitted with a slit located in its focus illuminated by a source located at finite distance, the said slit being parallel to the direction of the lines of the telecentric dispersive lens;

the telescopes fitted with the collimated diffracted beam and with the parallel incident beam are chosen from among a concave mirror, an off-axis parabolic mirror, a dioptric collimator, a mirror telescope;

the focal length f of the telescope receiving the diffracted beam has the value $R/2\cos\theta$, R being the radius of curvature of the telecentric dispersive lens and $2\theta$ the angle between the incident beam and the beam diffracted with the telecentric dispersive lens;

the telecentric dispersive lens is fixed and the variation in wavelength arising from the symmetrical rotation of two arms supporting the telescopes with respect to the bisectrix of the angle formed between the incident beams and the diffracted beams;

the direction of the incident beam coming from the slit-source is maintained fixed as well as that of the diffracted beam passing through the output slit, the said incident beam being initially reflected by a rotating plane mirror $M_1$, the corresponding angle at the summit being maintained equal to $\theta + \phi_1$, $\phi_1$ being the angle formed by the incident beam coming from infinity and OX the bisectrix of the angle $2\theta$ at the summit of the TDO formed by the incident beam at angle $\alpha$ and the beam diffracted at angle $\beta$ by the said telecentric dispersive lens, the said diffracted beam being reflected by a rotating plane mirror $M_2$ of which the angle at the summit is maintained at $\theta + \phi_2$, $\phi_2$ being the angle between the optical axis of the telescope $T_2$ and the OX bisectrix, the telecentric dispersive lens being translated in the direction OX;

the direction of the incident beam is maintained fixed by the rotation of a plane mirror $M_1$ reflecting the collimated beam in the direction of the TDO axis. This latter being translated in the direction of the object optical axis of the telescope;

the monochromator includes two telecentric dispersive lenses mounted in series. Depending on their respective orientation (positions of centers of curvature, with respect to the straight line joining their summits, there will be addition and subtraction of the dispersions.

Other advantages and characteristics of the present invention will also become apparent from the following detailed description given with reference to the appended drawings in which.

Figure 1A:
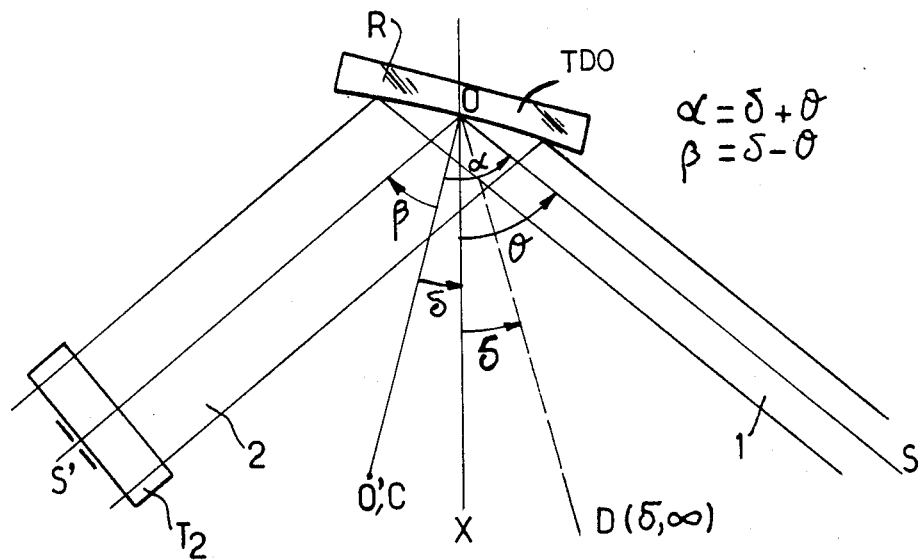
FIGS. 1A and 1B are diagrams of the principle of the monochromator of the invention.
Figure 1B:
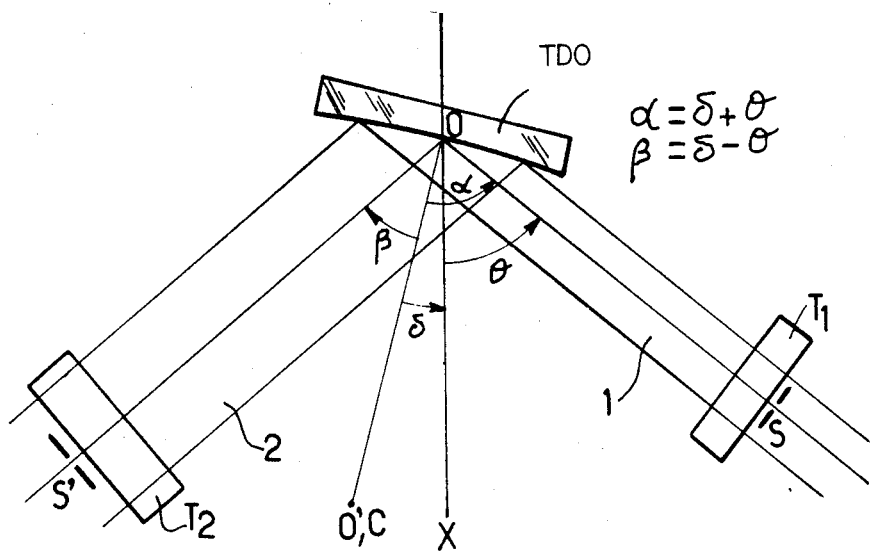

First of all the diagram of the principle according to FIGS. 1A and 1B are described.

These two figures are paractically identical but differ in that in FIG. 1A the collimated incident beam comes from an object at infinity while in FIG. 1B the collimated incident beam comes from an object at finite distance.

A telecentric dispersive lens TDO has been represented in FIGS. 1A and 1B. This telecentric dispersive lens TDO which is the diffracting element is a spherical holographic grating with non-uniform line distribution and having a radius of curvature R. In the case of a collimated incident beam 1 at an angle $\alpha$ coming from a source object at infinity (FIG. 1A) or from a telescope $T_1$ fitted with a slit S, located at its focus, illuminated by a source located at finite distance (FIG. 1B), the slit S being parallel to the direction of the lines of the telecentric dispersive lens TDO, the telecentric dispersive lens TDO, gives from the collimated incident beam 1, a collimated diffracted beam 2 at an angle $\beta$. The angle between the beams at the summit O of the TDO is equal to $\alpha - \beta = 2\theta$; such that $m\lambda = 2\lambda_o \cos\theta$, m being the order of diffraction and $\lambda_o$ the recording wavelength of the hologram; one point source C being located at the center of curvature of the lens TDO and the other D being at infinity and inclined at an angle $2\delta$ with respect to the normal to the TDO; this angle being equal to that formed by the normal to the telecentric dispersive lens TDO and the bisectrix of the angle $2\theta$. The collimated diffracted beam 2 at an angle $\beta$, with respect to the normal to the telecentric dispersive lens TDO, is focused at the focus of a telescope $T_2$ fitted with a straight slit S'; the optical axis of the telescope $T_2$ being merged with the direction of the diffracted beam 2 and the slit S' being parallel to the direction of the lines of the telecentric dispersive lens TDO.

The telecentric dispersive lens TDO is a spherical holographic grating characterized by its radius of curvature R and the angle $\delta$. Its generalized focusing equation is:

$$\frac{\cos^2\alpha}{r} + \frac{\cos^2\beta}{r'} = \frac{(1-\tan\delta\tan\theta)^2}{r} + \frac{(1+\tan\delta\tan\theta)^2}{r'} = 0$$

r and r' being the object distance and the image distance respectively. This telecentric dispersive lens TDO is stigmatic whatever many be the wavelength defined by the equation $m\lambda = 2\lambda_o \cos\theta$ and if $R^{-1} = r'^{-1} =$ (object and image at infinity).

In FIGS. 1A and 1B the telescopes $T_1$ and $T_2$ can be chosen from among a group including a concave mirror, an off-axis parabolic mirror, a dioptric collimator, a mirror telescope and any of the various combinations of the group devices, these optical devices including at their focus a slit S or S'.

According to the equation $m\lambda = 2\lambda_o \cos\theta$, in order to vary the stigmatism wavelength it is necessary to vary $\theta$.

Figure 3:
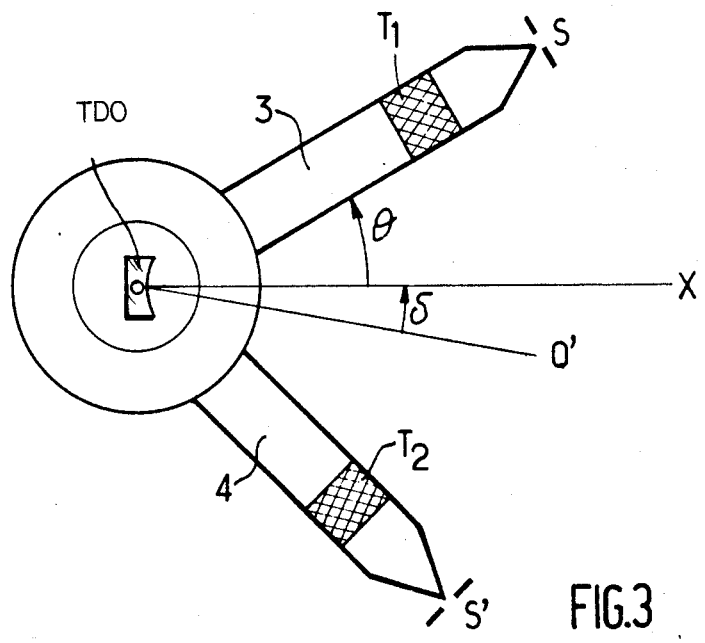
FIG. 3 represents a monochromator with a fixed telecentric dispersive lens.

Let us consider FIG. 3, wherein two arms 3 and 4 are shown extending radially outwardly from a common axis passing through the summit O of the telecentric dispersive lens TDO, which is fixed in space. Two telescopes $T_1$ and $T_2$, located on the two arms 3 and 4 are oriented in the direction of the summit O of the TDO. The two telescopes $T_1$ and $T_2$ include at their focus slits S and S'. Following the above definition with respect to FIGS. 1A and 1B, the telescopes $T_1$ and $T_2$ are therefore either a Cassegrainian telescope, a collimator, a parabolic mirror, a spherical mirror, a combination of aspherical mirrors (for grazing incidence), or any of the various combinations of these optical devices.

In such a monochromator, the variation in wavelength arises from the symmetrical rotation of the two telescopes $T_1$ and $T_2$ with respect to the bisectrix of the angle formed between the incident beams and the diffracted beams. The arms 3 and 4 are, for example, mounted on stepped turntables measuring $\theta$ or devices such as goniometers. It is also possible to envisage a pantograph that enables; by measuring the displacement of a nut situated on the conrol spindle, to measure $\cos\theta$ directly.

The spectral range covered is therefore a function of the optical transmission of the telescopes $T_1$ and $T_2$ and of $\theta$. If for example $5° \leq \theta \leq 80°$, then $0.972 \leq \lambda$ $\mu m \leq 0.169$, in the order $m = +1$. Accordingly, there is obtained a wide spectral range monochromator in which the telecentric dispersive lens TDO is fixed. This monochromator allows industrial tests that have not been possible to achieve until the present invention, since the scanned spectral range is much larger that that of monochromators known in the prior art.

Figure 2:
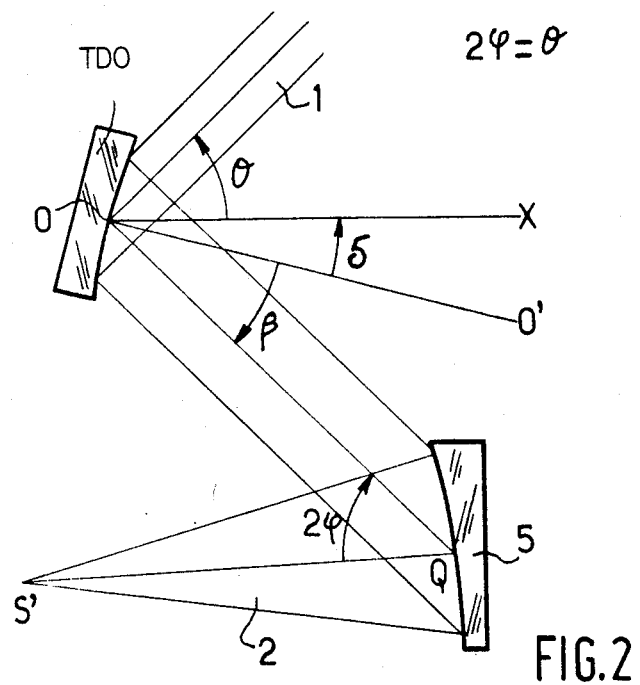
FIG. 2 is a diagram of a monochromator combining a telecentric dispersive lens and a parabolic mirror.

In FIG. 2, the incident beam 1 which comes from infinity at an angle $\alpha = \delta + \theta$ is, firstly, diffracted to infinity at an angle $\beta$ by the telecentric dispersive lens TDO with summit O, then it is focused at the focus of an off-axis parabolic mirror 5 of summit Q (focal length f). In this case, the only residual aberration is of the spherical aberration type. If $OQ = f = R/2 \cos \theta$, in other words if the focal length f of the telescope receiving the diffracted beam 2, in the present case, and the parabolic mirror 5 has the value, as indicated above, $f = R/2 \cos \theta$, R being the radius of curvature of the telecentric dispersive lens TDO and $2\theta$ the angle between the incident and the diffracted beams with the telecentric dispersive lens TDO, then we obtain an aplanatic monochromator with a distorsion free extended image field. This monochromator shown in FIG. 3 is a particular embodiment in which $2\phi = \theta$, $2\phi$ being the angle between the collimated diffracted beam coming from the telecentric dispersive lens TDO and the normal to the focusing mirror, i.e. the parabolic mirror 5.

The parabolic mirror 5 can be replaced by a spherical mirror in which case the angle $\phi$ between the parallel diffracted beam coming from the telecentric dispersive lens TDO and the normal to the focusing mirror is equal to $\theta$; and, in this case, $\theta$ is low approximately in the order of 10° or less.

The parabolic mirror 5 can be replaced by an elliptical and hyperbolic mirror combination (grazing incidence). The variation in wavelength can be obtained either by translation of the summit of the TDO in the direction OQ, or in the direction OX; a non-represented plane mirror located before the TDO allowing the direction of observation to be maintained fixed.

Figure 4A:
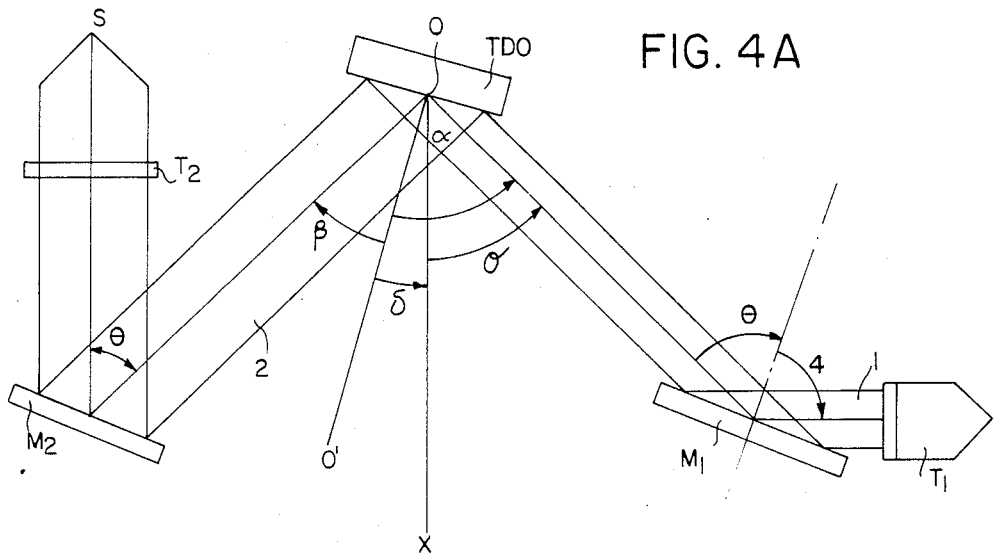
FIG. 4A illustrates a monochromator in which the direction of the incident and diffracted beams is fixed.
Figure 4B:
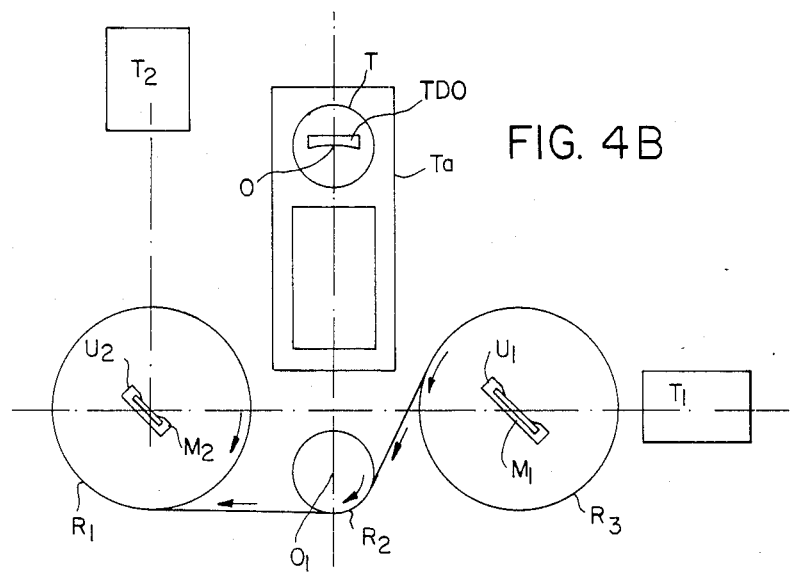
FIG. 4B shows simple mechanical means for pratical embodiments of the monochromator according to FIG. 4A.

Let us consider FIGS. 4A and 4B. In these figures, two plane mirrors $M_1$ and $M_2$ are introduced in the optical path between the telecentric dispersive lens TDO and at least one of the telescopes $T_1$ and $T_2$. They can both be rotated, as illustrated in FIGS. 4A and 4B or the mirror $M_2$ can be fixed while the mirror $M_1$ is rotated.

In FIG. 4A, the direction of the incident beam 1 and diffracted beam 2 is maintained fixed. First, the incident beam is reflected by a rotating plane mirror $M_1$ and the corresponding angle at the summit is maintained equal to $\theta + \phi_1$, $\phi_1$ being the angle formed by the incident beam coming from infinity and OX being the bisectrix of the angle $2\theta$ at the summit of the telecentric dispersive lens TDO formed by the incident beam at an angle $\alpha$ and the beam diffracted at an angle $\beta$ by the said telecentric dispersive lens TDO. The diffracted beam 2 is reflected by a rotating plane mirrow $M_2$ the angle at the summit of which is maintained equal to $\theta + \phi_2$, $\phi_2$ being the angle between the optical axis of the telescope $T_2$ and the OX direction, the telecentric dispersive lens TDO being translated in the OX direction.

It must be pointed out that the embodiment illustrated in FIG. 4A is a particular configuration in which the input and output beams are perpendicular. Such an embodiment is easier to implement in practice, but it is of course possible for the input and output beams not to be perpendicular, the overall configuration being slightly modified.

Figure 5:
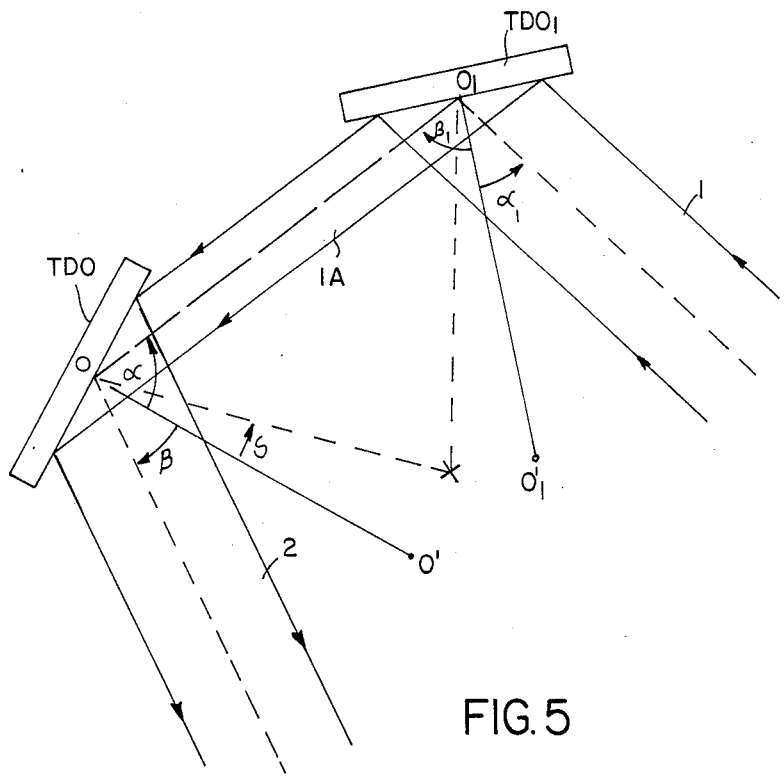
FIG. 5 illustrates an embodiment of the invention using two telecentric dispersive lenses TDO and $TDO_1$ mounted in series.

FIG. 4B shows a simple mechanical embodiment for obtaining both the rotation of the plane mirrors $M_1$ and $M_2$ and the translation of the telecentric dispersive lens TDO along the OX axis of FIG. 4A. The telecentric dispersive lens TDO is mounted on a turntable T allowing an adjustment of the orientation of the lens TDO. Below the telecentric dispersive lens TDO is a stepped translating table $T_a$ allowing the required translation along the OX axis. $T_1$ and $T_2$ are telescopes as already described in the other Figures. The two mirrors $M_1$ and $M_2$ are mounted on supports $U_1$ and $U_2$. Three cog wheels $R_1$, $R_2$, $R_3$ ensure the simultaneous rotation of the mirrors $M_1$ and $M_2$ mounted on their respective supports $U_1$ and $U_2$. The cog wheels $R_1$, $R_2$ and $R_3$ turn in the direction of the arrows and are connected by a belt or any similar suitable means. The measurement of wavelength is obtained by measuring the displacement of the table $T_a$ which is given by two equivalent non-represented arms pivoting about the points O (summit of the telecentric dispersive lens TDO) and $O_1$. FIG. 5 illustrates an embodiment of the invention using two telecentric dispersive lenses TDO and $TDO_1$ mounted in series. These two telecentric dispersive lenses TDO and $TDO_1$ are two identical spherical holographic gratings. In FIG. 5, the incoming beam is indicated by 1, while 1A is the portion of the beam between the two gratings $TDO_1$ and TDO. The diffracted beam is indicated by 2. The arrows show the direction of the beam.

The present invention does not relate to the telecentric dispersive lens in itself, which the applicant has already described in U.S. patent application Ser. No. 517,418 filed on the July 26, 1983; but the subject of the present invention is a monochromator using the combination of such a telecentric dispersive lens (or of two mounted in series as shown in FIG. 5) with telescopes; such as the combination of such a telecentric dispersive lens or of such telecentric dispersive lenses with telescopes and the interposition of mirrors between the telescope or telescopes and the telecentric dispersive lens or lenses.

The present invention does not relate to the embodiment of the telecentric dispersive lens, but considers a method, called holographic, and describes therefore the recording characteristics enabling the obtaining of a characteristic non-uniform distribution of fringes. In the plane of the TDO, this distribution of fringes results from the intersection of a section of a sphere (of centre O' and radius R) with an elliptic paraboloid, which represents the equiphase surfaces of the interference system obtained from a point source located at the center of curvature and a parallel beam inclined at an angle $\delta$. This known fringe distribution may be also be generated by mechanical or ion beam processing. In this case, the number of lines per millimeter is not limited by the practically allowed value of the angle $\delta$.

Variations and changes in the apparatus for performing the method of the invention may be made by those skilled in the art without departing from the spirit of the present invention. The detailed description of the illustrated embodiments is for illustrative purposes only and is not intended to limit the scope and spirit of the invention as set forth in the appended claims.

What is claimed is:

1. A monochromator comprising a spherical holographic grating with non-uniform line distribution produced by an holographic process for receiving a collimated incident beam at an angle $\alpha$ with respect to a normal of the grating, and for reflecting a collimated diffracted beam at an angle $\beta$ with respect to the normal of the grating, the angle between the incident and reflected beams at a summit of said grating being $\alpha - \beta = 2\theta$ such that $m\lambda = 2\lambda_o \cos \theta$, m being the order of diffraction and $\lambda_o$ being the recording wavelength of the hologram, a first source point being at the center of curvature O' of said spherical grating and a second source point being at infinity and inclined at an angle $\delta$ with respect to the normal to said grating, the angle $\delta$ being equal to that formed by the normal to the grating and the bisectrix of the angle $2\theta$ wherein the collimated diffracted beam at an angle $\beta$, with respect to the normal to the grating, is focused at the focus of a first telescope fitted with a straight first slit, the optical axis of the first telescope being merged with the direction of said diffracted beam and the slit being parallel to the direction of the lines of the grating.

2. A monochromator according to claim 1, wherein the collimated incident beam comes from a second telescope fitted with a second slit located at the focal point of said second telescope and illuminated by a source located at finite distance, the second slit being parallel to the direction of lines of the grating.

3. A monochromator according to claim 1, wherein the first telescope is selected from the group consisting of a concave mirror, an off-axis parabolic mirror, a dioptric collimator, and a mirror telescope.

4. A monochromator according to claim 2, wherein the second telescope is selected from the group consisting of a concave mirror, an off-axis parabolic mirror, a dioptric collimator, and a mirror telescope.

5. A monochromator according to claim 1, wherein the focal length of the first telescope receiving the diffracted beam has the value $R/2 \cos \theta$, R being the radius of curvature of the spherical grating and $2\theta$ being the angle between the incident beam and the diffracted beam.

6. A monochromator according to claim 2, wherein the spherical grating is fixed and said first and second telescopes are mounted on two arms that are each pivotable with respect to the bisectrix of the angle formed between the incident beam and the diffracted beam.

7. A monochromator according to claim 2, wherein the direction of the incident beam coming from the second slit is maintained fixed as well as that of the diffracted beam passing through the first slit, the incident beam being initially reflected by a first rotating plane mirror and the corresponding angle between the incident and reflected beams at said first mirror being maintained equal to $\theta + \phi_1$, $\phi_1$ being the angle formed by the incident beam and the bisectrix of the angle $2\theta$ at said summit of the grating, which is formed by the incident beam at angle $\alpha$ and the beam diffracted at angle $\beta$ by said grating, the diffracted beam being reflected by a second rotating plane mirror at an angle which is maintained equal to $\theta + \phi_2$; $\phi_2$ being the angle between the optical axis of the first telescope and the bisectrix of the angle $2\theta$, wherein the spherical grating is translated in the direction of said bisectrix.

8. A monochromator according to claim 1, wherein the direction of the collimated incident beam is maintained fixed as well as that of the diffracted beam, passing through the first slit, the incident beam being initially reflected by a rotating plane first mirror at an angle equal to $\theta + \phi_1$; $\phi_1$ being the angle formed by the incident beam coming from infinity and the bisectrix of the angle $2\theta$ at said summit of the grating, which is formed by the incident beam at angle $\alpha$ and the beam diffracted at angle $\beta$ by said grating, the diffracted beam being reflected by a second rotating plane mirror at an angle equal to $\theta + \phi_2$; $\phi_2$ being the angle between the optical axis of the first telescope and the bisectrix of the angle $2\theta$, wherein the spherical grating is translated in the direction of said bisectrix.

9. A monochromator according to claim 1, wherein the direction of the incident beam is maintained fixed by the rotation of a plane mirror which reflects the collimated beam onto the grating, said grating being translated in the direction of an optical axis of the first telescope.

10. A monochromator according to claim 1, wherein two spherical gratings are mounted in series.

* * * * *